3,522,173
WATER PURIFICATION METHOD
William Edward Lindman, Grass Valley, Calif., and Mark
F. Adams, Pullman, Wash., assignors to Western Mechanical, Inc., Spokane, Wash., a corporation of Washington
Filed Nov. 12, 1968, Ser. No. 774,670
Int. Cl. C02c 1/40, 5/04
U.S. Cl. 210—49
4 Claims

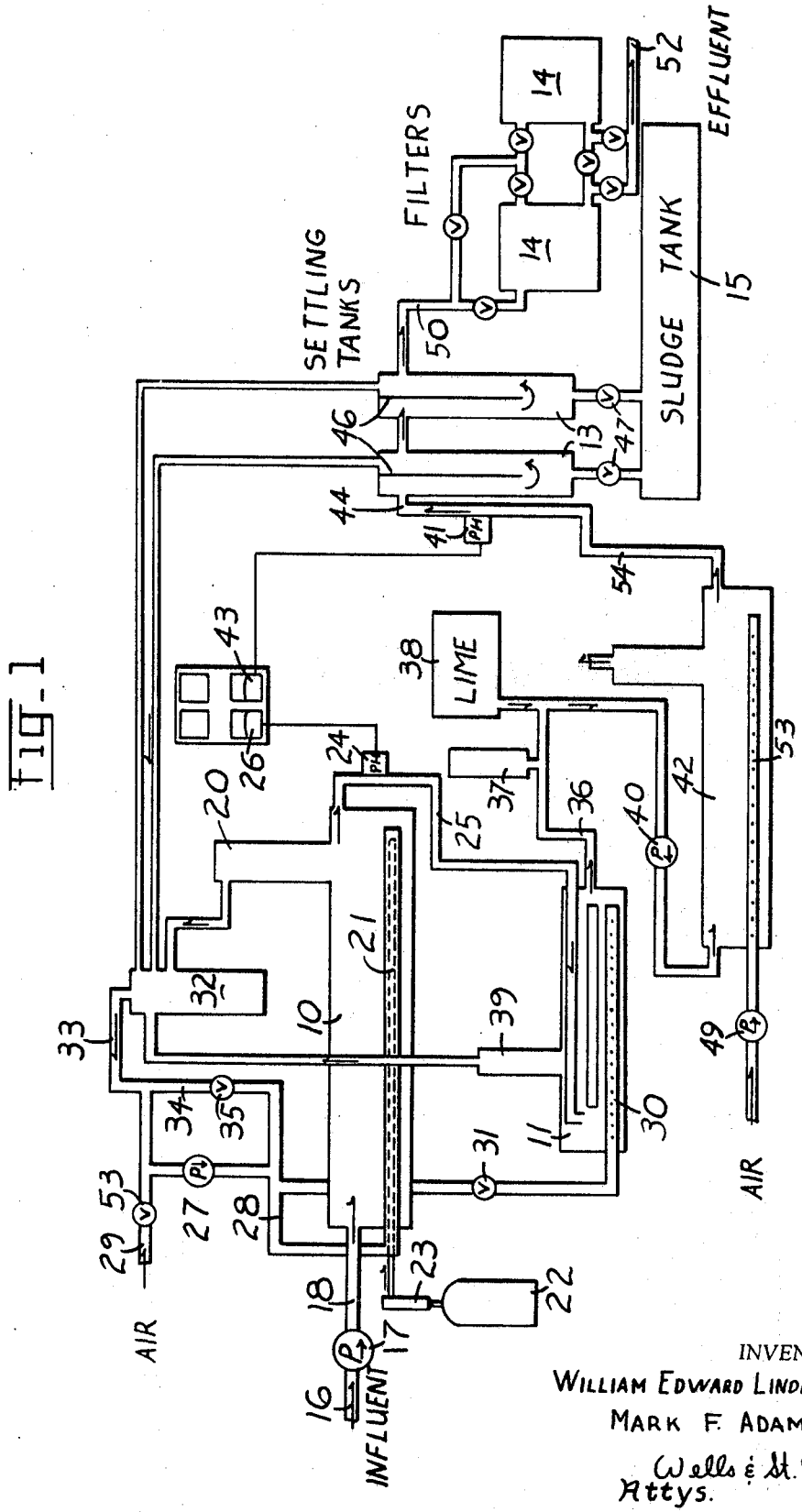

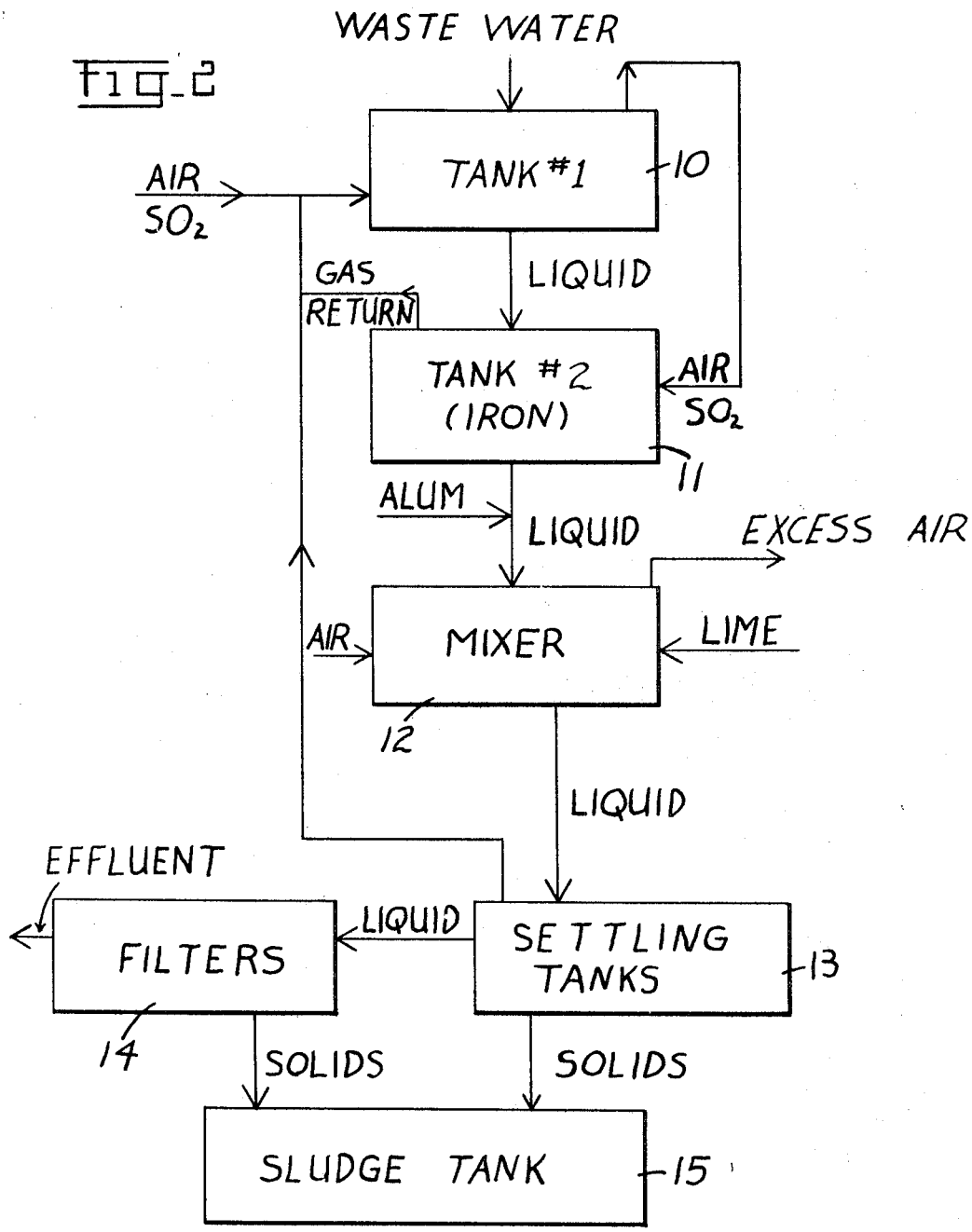

ABSTRACT OF THE DISCLOSURE

A water purification method that involves the treatment of sewage waste water by intimately passing through the water a gaseous mixture containing sulphur dioxide and oxygen. The treatment also includes the addition of scrap iron, which is spent in the resulting acid solution. The treated water is then neutralized. The solid constituents of the resulting neutral solution are precipitated to produce usable water.

BACKGROUND OF THE INVENTION

The disclosure herein is concerned with water processing, particularly the processing of waste water from domestic sewage. It relates to a continuous process for recovering usable water from sewage, the processed water being of sufficient purity for normal agricultural and domestic purposes, including human drinking purposes.

As used herein, the term "domestic sewage" may be defined as "sewage derived principally from dwellings, business buildings, institutions and the like (it may or may not contain ground water, surface water or storm water)." This definition is taken from Glossary of Water and Sewage Control Engineering, published 1949 by the American Public Health Association, American Water Works Association, American Society of Civil Engineers and Federation of Sewage Works Association. The process is applicable to both small scale and large scale water treating operations. It can be utilized in portable or permanent installations and on vehicles such as boats, aircraft, or trains. It also can be used for individual dwelling units or for groups of dwellings. The treated water can be returned to streams or other natural sources of water, can be used for irrigation and sprinkling purposes, and can be purified for drinking purposes if required.

The treatment and utilization of water from sewage is a problem that has confronted men through all ages. The problem becomes acute in areas that suffer a shortage of fresh water and on vehicles which must carry with them the complete supply of water for human use. The disposal of waste water from raw sewage is a particular problem in well-populated areas, where considerable amounts of domestic sewage are still dumped into bodies of water such as lakes and streams. Unless the waste water is treated prior to dumping, the increasing pollution of the body of water creates additional health and aesthetic problems.

There are many types of sewage plants in operation today. The methods of such treatment generally are designed to change the substances in the sewage so that undesirable elements can be removed. Water is the principal constituent of sewage. Normal domestic sewage contains 500 parts per million of solids. Half of these solids are in solution, a quarter of the solids will settle, and a quarter of the solids are in suspension. Organic solids usually constitute between 40–70% of the total solids, and cause the greatest difficulties in sewage disposal. The treatment and subsequent removal of organic solids is one of the prime considerations of the present process.

The process disclosed herein relates to the chemical treatment of waste water from sewage. Chemical treatment in itself is not new, but the choice of chemicals for precipitation of material in sewage and the manner of introduction of such chemicals has not been developed to the same degree as other treatment methods, such as sedimentation and biological treatment. The prime material used in gaseous form for sewage treatment is chlorine. Chlorination is used almost exclusively in actual practice today for disinfection of sewage and water.

Prior patents have dealt with the use of sulphur compounds for water processing, but the disclosed methods have not been accepted commercially. One example is U.S. Pat. No. 653,741 to Jewell, which involves the use of sulphurous acid solution and scrap iron to produce a reactant solution that is mixed with water to be treated in a liquid process. Two patents to Maclachlan, U.S. Pats. Nos. 1,511,418 and 1,543,939, each discuss the treatment of sewage sludge with sulfur dioxide gas. However, the patents make no mention of the process as being applicable to water treatment, and neither patent discusses the use of the method for water purification purposes.

The present method provides a continuous and effective process for purifying and sterilizing waste water, such as is present in domestic sewage. The primary chemical reaction relates to the passage of sulphur dioxide and oxygen intimately through the flowing water to create an acidic solution. Scrap iron is added and the solution is subsequently neutralized. Flocculent producing chemicals are also added when desired. The resulting effluent can then be settled, filtered and further processed as necessitated by its intended end use. The process differs from those previously proposed in that it is concerned with the treatment of water, not solids, and in that it can be practiced in totally enclosed chemical systems which do not release to the atmosphere any undesirable gases or other contaminants. Furthermore, the economics of the method make it adaptable for use in competition with other commercially available sewage treating systems.

SUMMARY OF THE INVENTION

The method disclosed and set out in this application primarily comprises the step of vigorously passing a gaseous mixture containing oxygen and sulphur dioxide through waste water, the step of neutralizing this solution by adding alkaline material and the final step of precipitating the insoluble solids from the neutralized solution. It is concerned with the particular chemicals used and the sequence of their application to waste water in an economical process.

It is a first object of this invention to provide an economically justifiable process for chemically treating waste water from sources of domestic sewage.

Another object of the invention is to provide a closed system of chemical waste water treatment which will not contribute to contamination of the surrounding environment. The treatment plant and method disclosed herein does not introduce an additional nuisance to the plant location, and can therefore be used in restricted applications, such as on vehicles, or for individual dwelling units such as summer cabins, residences, etc.

Another object of the invention is to provide an effective method for waste water treatment using gaseous elements as the primary reacting chemicals, thereby simplifying the manner of application of such chemicals and the normal difficulties that result from the utilization of solid or liquid reactants in large scale applications.

These and further objects will be evident from the following disclosure, taken also with the accompanying drawings, which disclose the basic flow sheet and schematic apparatus.

BRIEF DESCRIPTION OF THE DRAWINGS

FIG. 1 is a schematic diagram showing the apparatus used in the disclosed method, and FIG. 2 is a flow diagram of the process.

DESCRIPTION OF THE PREFERRED EMBODIMENT

The process described herein is essentially outlined in the flow diagram of FIG. 2. The process is designed for treatment of waste water from raw domestic sewage. The supply of waste water is directed to a first tank 10. As it flows through tank 10, it is vigorously agitated by the passage of a gaseous mixture of air (or oxygen) and sulphur dioxide. The resulting solution then enters a second tank 11, where the gaseous mixture is again passed through it. The second tank further contains scrap iron, which is taken into solution by the demand of the acidic solution. Where desired, alum is then added to the liquid solution that leaves tank 11, to produce a flocculent precipitate upon neutralization. The treated acid solution enters a pump 40, which serves as a mixer where lime or other alkaline chemicals are added to it to produce a precipitate that is separated from the solution in settling tanks 13. The liquid that flows from settling tank 13 is then filtered at 14 and exits as an effluent stream that meets all standards for coliform bacteria content. The resulting water can be used for irrigation purposes or even for human consumption, provided that the filtering of the water is adequate for this latter purpose. Solids which precipitate from the solution are received in a sludge tank 15 for disposal or further processing according to known sludge treatment processes.

Taking the steps of the method more specifically, the schematic diagram of the structure in FIG. 1 illustrates the manner in which the various operating components are interconnected to produce a continuous waste water treatment process. The incoming waste water at conduit 16 should preferably have primary sewage treatment before being introduced into the present equipment. Such primary treatment might involve grinding of solid materials or primary separation of solids in a manner such as is used in the primary clarifier of a municipal sewage treatment plant.

The incoming supply of waste water is directed into the system by either a gravity supply or by a constantly operating pump 17. The outlet of pump 17 is directed through conduit 18 to the interior of an elongated horizontal tank 10. Tank 10 is preferably a cylindrical sealed enclosure having a vertically enlarged tower 20 at the end opposite to its connection to conduit 18. Tower 20 prevents escape of liquid from within tank 10 into the recirculating system for excess gas.

An elongated perforated manifold pipe 21 extends the entire length of the interior of tank 10. A gaseous mixture of sulphur dioxide and oxygen (in the form of either oxygen gas or as a component of atmospheric air) is forced through the perforated pipe 21. The source of sulphur dioxide is shown as a pressurized container 22 connected to the interior of pipe 21 by a metering vave 23. Valve 23 can be manually controlled or can be automatically responsive to a pH monitoring apparatus 24 at the outlet conduit 25 leading from tank 10. As shown, the pH monitoring apparatus 24 is connected to a visual indicating device 26, which in turn might include controls for the valve 23.

In the illustrated example, oxygen in the form of atmospheric air is received through an outside air connection 29 and is forced into pipe 21 by means of a conventional pump 27 connected to a branched air conduit 28. One branch of the conduit 28 is in direct communication with the interior of pipe 21.

The second tank 11 is also provided with an interior perforated manifold pipe 30 extending along its full length. The liquid conduit 25 directs the incoming solution from tank 10 to one end of tank 11. The solution passes along the entire length of tank 11 and is again vigorously agitated by the gaseous mixture that is distributed along pipe 30. Pipe 30 is connected to the second branch of conduit 28 by means of a variable flow valve 31 which again can be manually or automatically controlled.

Immediately above the manifold pipe 30 is a screen tray of stainless steel or other material non-reactive in an acidic solution. It contains pieces of scrap iron, which are periodically replaced as required by the demand of the chemical reactions within tank 11.

The tank 11 is also provided with an integral elevated tower 39 for the collection of excess gas from within the tank. The tower 39 and tower 20 each lead to a collecting reservoir 32 having an outlet conduit at 33 in communication with the input of pump 27. A bypass conduit 34 extends around the pump 27 so that excess pressure within the reservoir 32 can be diverted back into the branched conduit 28 by means of an automatic valve 35.

The effluent from tank 11 flows outward through a conduit 36, wherein alum is interjected into the stream by a suitable metering device 37. Use of alum is optional, depending upon the requirement of the system. The apparatus 37 provides a constantly monitored supply of alum into the effluent solution from tank 11 to assist in producing a flocculent precipitate during neutralization of the solution.

The conduit 36 leads to a pump 40 where the solution is mechanically mixed with a lime solution provided by a lime slurry feeder 38. The lime slurry feeder 38 provides a controlled flow of lime to pump 40, the amount of lime being either manually controlled or automatically controlled by means of a pH monitoring apparatus 41. The apparatus 41 is operatively connected to a visual indicator 43 and may also be operatively connected to suitable controls for the lime slurry feeder 38 where automatic operation is desired. The lime acts chemically to neutralize the acidic solution entering mixer 40.

It is imperative that all matter in the liquid be oxidized, either in the acidic medium or during neutralization. Therefore, the liquid from pump 40 is directed to a vented tank 42 similar to tanks 10, 11. Atmospheric air under pressure is provided in excess quantities by a pump 49. The air is vigorously and intimately mixed with the solution along a manifold 53. The effluent at conduit 54 is monitored by the pH monitoring apparatus 41 and is directed to the first settling tank 13.

The tanks 13 are identical and are connected in series with one another. Each includes a vertical baffle 46 which serves to increase the length of the path that must be traversed by the flowing liquid. The tanks 13 slow the rate of flow of the liquid and permit the solid precipitates carried by the liquid to settle along their lower portions. Suitable outlet connections and control valves 47 are provided to permit relief of solid material from within tanks 13 to a receiving sludge tank 15.

The effluent within the final outlet conduit 50 leading from tanks 13 is directed to one of two alternately used filters 14. Filters 14 are of conventional manufacture, and are operable to remove suspended solid materials from the neutralized liquid. As an example, the filters 14 might be conventional sand filters as shown, having a cross back-flush connection so that one filter can be flushed during the time the other is being used. Solid material flushed from the filters 14 is also received within sludge tank 15. The final filtered water is directed through an outlet conduit 52. The solid material received within sludge tank 15 can be treated according to conventional sludge techniques or can be disposed of by burial or other disposal methods.

The above general description is concerned with a water treatment process wherein the water at outlet 52 is required to be in a highly purified form. Where the outlet water is to be discharged into a body of water such as a lake or stream, the water might be discharged from the conduit 42. The degree of filtration and final treatment of the water will depend upon its ultimate use requirements.

OPERATION OF PILOT PLANT

A pilot plant has been operated according to the flow chart in FIG. 2, utilizing the general apparatus shown schematically in FIG. 2. As influent material, the liquid solution received by conduit 16 was the supernatant water from a primary clarifier of a municipal sewage treatment plant at Pullman, Wash. The input flow was 8.6 liters per minute (2.27 gallons per minute or 136 gallons per hour). This fluid flowed in a continuous stream through tank 10, which is 74 inches long and 8 inches in diameter. The fluid content of tank 10 during operation is 24.8 liters. The manifold tube 21 is two inches in diameter and extends along the full length of the tank interior. Small perforations occur at close intervals along the full length of tube 21.

The mixture of sulphur dioxide and air is circulated in the pilot plant operation by a positive displacement pump 27 utilizing a one-half horsepower motor. The flow from pump 27 is sufficient to constantly churn and mix the liquid contents of tank 10 in a rather vigorous manner. Sulphur dioxide gas under storage pressure is added through the manifold 21 at a rate of approximately 1.94 grams per minute (0.25 pound per hour or 1.44 cubic feet per hour at 70 degrees F. and 14.7 p.s.i.a.). The rate of application of sulphur dioxide is set so as to maintain a pH value below 3 at the outlet conduit 25, the operating pH value chosen during pilot plant operation being 2.5. This results in an acidic solution at the outlet of tank 10.

The amount of sulphur dioxide required to maintain the desired degree of acidity naturally depends on the composition of the influent waste water. Three samples taken within the 36 hour period from the primary clarifier at Pullman, Wash., were found to require 2.04, 1.94 and 1.75 grams per minute of sulphur dioxide respectively. The variation in the required amount of sulphur dioxide must be controlled by manual observation or by automatic equipment of common manufacture.

Air is absorbed by the waste water during treatment in tank 10. The amount of air entering the system is controlled by a flow control valve 53 which permits the air to enter at the rate of about 13 liters per minute (28 cubic feet per hour).

The tower 20 at the outlet end of tank 10 is 15 inches tall and 6 inches in diameter. It prevents water from entering the gas recirculation system. Excess undissolved sulphur dioxide and air is recirculated in the closed system including reservoir 32 and is prevented from being forced through the outlet conduit 25 or from escaping into the atmosphere where the escaping sulphur dioxide gas would be normally undesirable.

The liquid in conduit 25 next flows through the length of tank 11, which is 37 inches long and 8 inches in diameter. It operates with a liquid content of 11.4 liters. The scrap iron in the tank is in excess of that required, being periodically recharged by the addition of more material. The amount of iron reacting with the liquid is governed by natural chemical demand. It has been found to average about one quarter pound per one thousand gallons of liquid. The tower 39, similar to tower 20, is also connected to the gas recirculating system.

The addition of alum (aluminum sulphate) is metered in the pilot plant operation by use of a large burette. Aluminum sulphate in a 14% solution of water is metered at the rate of 0.25 gram per minute or 0.033 pound per hour. This has been found to be adequate to produce flocculent precipitate after neutralization of the liquid solution.

Neutralization with an alkaline material in the form of lime (calcium hydroxide) is accomplished in a conventional pump which violently churns its contents. Other suitable mixing devices could be used. The lime emulsifier and feeder 38 adds lime in a slurry at about 2.8 grams of lime per minute or 0.37 pound per hour. This maintains an average pH value of 7 at conduit 42. The pH value has been found in actual practice to fluctuate between 6 and 8. Such fluctuations can be minimized by the use of more efficient control devices for automatic variation of the rate of lime addition.

Tank 42 is the same general size as tank 11, providing thorough mixing of liquid and large quantities of oxygen (air). The amount of air supplied to tank 42 is more than adequate to saturate the solution within it. It vigorously agitates the solution once more to accomplish thorough oxidation.

The lime is fed from a five gallon reservoir having a propeller mixer. A 2% lime slurry in water is moved by a peristaltic pump having a variable speed control by which the rate of lime application can be changed as required.

The settling tanks 13 are each 36 inches tall and 8 inches in diameter. The products of neutralization and any excess lime in the liquid precipitate within the tanks 13, which each have a content of 20.8 liters of liquid. The effluent in conduit 50 is usually cloudy, due to the suspension of solid materials which can be removed by subsequent filtration.

PILOT PLANT RESULTS

The above described pilot plant has been operated with waste water from a domestic sewage source in the manner disclosed herein. The raw influent waste water and the effluent treated water were analyzed and averaged for seven runs of the equipment. The analytical results are as follows (each figure states the average value, with the actual ranges of values following in parenthesis):

|  | Raw Sewage | Effluent |
| --- | --- | --- |
| Coliform (MPN/100 mls.) | 18×10⁶ (0.9–54) |  |
| C.O.D.[1] (mg./l.) | 766(90–2,340) | 66(0.2–140) |
| Phosphate (mg./l.) | 19.5(12–29) | 3(0.3–8.2) |
| Nitrogen (mg./l.) | 29(14–67) | 17.8(10–35) |
| T.D.S.[2] (mg./l.) | 328(200–640) | 1,050(820–1,700) |
| pH | 7.4(7.2–7.8) | 7.7(6.3–9.0) |

[1] C.O.D.=Chemical oxygen demand. This is a measure of the organic material present in the sample and also indicates the amount of oxygen that will be consumed by a given volume of the sample.
[2] T.D.S.=Total dissolved solids. This is a measure of all of the dissolved compounds both organic and mineral contained in the sample.

The coliform count of the effluent has been established by prior test procedures as being less than 2.2 MPN (Most Probable Number) per 100 mls., which meets class AA water specifications in the United States.

The C.O.D. (chemical oxygen demand) procedure was used in preference to B.O.D. (bacterial oxygen demand) for two reasons: (1) The B.O.D. takes much longer to run (48 hrs. vs. 2 hrs.), and (2) the B.O.D. procedure will not work in the presence of sulfur dioxide which is present in the effluent. The B.O.D. must always be equal to or less than the C.O.D. The raw sewage samples had a wide range of C.O.D. as would be expected. The resultant effluent water shows a much narrower spread and an average reduction in C.O.D. after correction for residual sulfur dioxide of 95%.

The phosphate content of the effluent water is of importance since it is a nutrient compound for both microorganisms and algae. If the effluent water is to be discharged into a lake or stream it is desirable to eliminate as much of the phosphate as possible. The process reduces the phosphate by an average of over 80%.

The total nitrogen content of the raw sewage is reduced approximately 50% by the process. The nitrogen content (particularly the ammonia nitrogen) serves as a plant and microorganism nutrient.

The T.D.S. (total dissolved solids) content was found to be relatively low for sewage water. The process increased the T.D.S. by a factor of 3 due exclusively to introduction of lime in the neutralization step. The increased lime and the presence of sulfate and sulfite gives the effluent water a high permanent hardness content.

The pH (acidity or alkalinity) can be controlled to any reasonable value from pH 2.5 (acid) to pH 10 (alkaline) or lower and higher if desired.

The effluent water is both palatable and potable. The water is crystal clear and odorless. The permanent hardness content is a drawback, however, this can be controlled by ion exchange procedures if desired.

The effluent water is satisfactory (high quality) for discharge into existing streams, lakes, irrigation supplies, harbors, and can be used directly for sprinkling of lawns, golf courses, gardens, etc.

Further modifications in the equipment and mode of operation are expected to further reduce the C.O.D., phosphate, and total nitrogen contents and to materially reduce the permanent hardness of the effluent water (and thus the total dissolved solids).

The pilot plant operation has confirmed that the process is economically justifiable. One drawback of most prior chemical treating processes for water has been the cost of the reagent, which is consumed in the process. The above process can operate at a low reagent cost. The amount of reagent required for each 1000 gallons of treated water is as follows: sulphur dioxide, 1.85 pounds, calcium oxide, 2.2 pounds and aluminum sulfate, 0.22 pound.

The pilot plant is both compact and efficient. The pilot plant described occupies a total volume of 20 cubic feet for an output of about 3000 gallons per hour day. It is estimated that a plant having a 100,000 gallon per day capacity would occupy not more than 500 cubic feet.

ANALYSIS OF PROCESS

A full chemical analysis of the steps in the above process is not available due to the complexity of the many chemical reactions which occur in the continuously flowing liquid solutions. However, the reduction of the coliform count and of the C.O.D. in the influent waste water is accomplished in tanks 10 and 11. In tank 10, the reaction appears to be primarily the chemical oxidation of the composition of the waste water within an acidic medium. The acidic nature of the solution immediately kills all coliform bacteria present in the waste water. The vigorous action of the incoming gases insures complete and continuing mixing of all the gaseous and liquid elements during their passage through the tank.

The reaction in tank 11 introduces oxidation and reduction steps, the effluent from tank 11 having been found to include ferrous sulphite evidently formed as a result of the reaction with the scrap iron. The iron content serves to assist in forming a coagulant during lime treatment. The effluent from tank 11 is saturated with oxygen, nitrogen and sulphur dioxide in the form of sulphite ions. Little organic matter is present in this effluent.

The addition of alum (aluminum sulphate) assists in the precipitation of the dissolved and suspended material. The alum acts as a coagulant and as a precipitant for dissolved phosphates. The subsequent addition of the lime slurry precipitates the iron and aluminum compounds in the solution, along with any excess sulphate and sulphite compounds. The effluent leaving the lime mixer is a thin slurry which can be clarified by mechanical separation and filtration.

The addition of lime and oxygen (air) oxidizes any excess sulphur dioxide and iron. It eliminates sulfites. While it results in hard water, this presents no real difficulty in subsequent utilization of the water.

While the neutralizing step discussed herein has related primarily to the use of lime, other alkaline materials can be substituted in place of lime. Alternatives include ammonia, which introduces additional nitrogen in the final effluent, barium hydroxide, sodium hydroxide, magnesium hydroxide or organic amines. The amount of such chemicals added is regulated to produce the desired neutral solution.

Having thus described our invention, we claim:

1. A method of treating waste water from domestic sewage, comprising the following steps:
   vigorously passing a controlled amount of sulphur dioxide through the waste water, together with an amount of gaseous oxygen in excess of that needed to saturate the treated waste water;
   bringing the treated waste water into contact with a source of metallic iron;
   subjecting the source of metallic iron and treated waste water in contact therewith to continuing vigorous passage of gaseous oxygen;
   monitoring the acidity of the treated waste water;
   controlling the amount of sulphur dioxide passed through the waste water in response to the monitoring of the treated waste water so as to maintain the monitored acidity at a level adequate to insure bacterial kill;
   neutralizing the treated waste water by addition of an alkaline material;
   continuing the vigorous agitation of the neutralized waste water by passing an amount of gaseous oxygen through it in excess of that needed to saturate the neutralized waste water;
   and separating the liquid and solid components of the resulting waste water.

2. A method as set out in claim 1 wherein the amount of sulphur dioxide passed through the waste water is adequate to maintain the monitored acidity of the treated waste water below a pH value of 3.

3. A method of treating a stream of waste water from domestic sewage, comprising the following steps:
   directing an influent stream of the waste water through the inlet of a sealed vessel having an opposed outlet;
   vigorously agitating the waste water within the vessel by passing a controlled amount of sulphur dioxide through the waste water, together with an amount of gaseous oxygen in excess of that needed to saturate the waste water within the vessel, the passage of sulphur dioxide and oxygen being carried out throughout the space separating the vessel inlet and outlet;
   bringing the treated stream of waste water into contact with a source of metallic iron, while continuing the passage of oxygen through the waste water in contact with the source of metallic iron;
   monitoring the acidity of the effluent stream of treated waste water at the vessel outlet;
   controlling the amount of sulphur dioxide passed through the waste water in response to the monitoring of the treated waste water so as to maintain the acidity at a level adequate to insure bacterial kill;

neutralizing the stream of treated waste water by addition of an alkaline material;

continuing the vigorous agitation of the neutralized stream of waste water by passing an amount of gaseous oxygen through it in excess of that needed to saturate the neutralized waste water;

and separating the liquids and solid components of the resulting stream of waste water.

4. A method as set out in claim 3 wherein the amount of sulphur dioxide passed through the waste water is adequate to maintain the monitored acidity of the treated waste water below a pH value of 3.

References Cited

UNITED STATES PATENTS 2,074,082  3/1937  Domogalla _____ 210—53
2,171,203  8/1939  Urbain et al. _____ 210—50

MICHAEL E. RODGERS, Primary Examiner

U.S. Cl. X.R.

210—45, 53, 64, 96, 199